US010997860B2

(12) United States Patent
Tsuge et al.

(10) Patent No.: US 10,997,860 B2
(45) Date of Patent: May 4, 2021

(54) PARKING ASSISTANCE DEVICE

(71) Applicant: Hitachi Automotive Systems, Ltd., Hitachinaka (JP)

(72) Inventors: Munetoshi Tsuge, Hitachinaka (JP); Koji Takahashi, Hitachinaka (JP); Masato Imai, Tokyo (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/979,016

(22) PCT Filed: Feb. 13, 2019

(86) PCT No.: PCT/JP2019/005050
§ 371 (c)(1),
(2) Date: Sep. 8, 2020

(87) PCT Pub. No.: WO2019/187720
PCT Pub. Date: Oct. 3, 2019

(65) Prior Publication Data
US 2021/0056848 A1 Feb. 25, 2021

(30) Foreign Application Priority Data

Mar. 30, 2018 (JP) .............................. JP2018-070215

(51) Int. Cl.
*B62D 15/02* (2006.01)
*G08G 1/14* (2006.01)
(Continued)

(52) U.S. Cl.
CPC ......... *G08G 1/143* (2013.01); *G06K 9/00798* (2013.01); *G06K 9/00805* (2013.01);
(Continued)

(58) Field of Classification Search
CPC .................................... B62D 1/00; G08G 1/00
See application file for complete search history.

(56) References Cited

U.S. PATENT DOCUMENTS

| 2010/0274446 A1* | 10/2010 | Sasajima | G08G 1/165 |
| | | | 701/36 |
| 2012/0173080 A1* | 7/2012 | Cluff | B62D 15/028 |
| | | | 701/42 |

FOREIGN PATENT DOCUMENTS

| JP | 2009-151378 A1 | 7/2009 |
| JP | 5151803 B2 | 2/2013 |
| JP | 2017-19332 A | 1/2017 |

OTHER PUBLICATIONS

International Search Report with English translation and Written Opinion issued in corresponding application No. PCT/JP2019/005050 dated May 14, 2019.

\* cited by examiner

*Primary Examiner* — Shirley Lu
(74) *Attorney, Agent, or Firm* — Foley & Lardner LLP

(57) ABSTRACT

A parking frame for which a parking route cannot be generated is excluded from selection objects by a simple determination. The parking assistance device acquires information on an entrance width of a frame entrance of the parking frame and information on a passage width of a passage, and calculates a minimum projection amount wm in a passage width direction of a vehicle 220 from the parking frame 203 to the passage 205 when a vehicle corner on a front side of the vehicle in an approach direction to the parking frame and on a first side in a vehicle width direction is located at the entrance end on the first side of the parking frame in the frame width direction, and when the vehicle is disposed at a position where the vehicle side part on a second side of the vehicle in the vehicle width direction is (Continued)

in contact with the entrance end on the second side of the parking frame in the frame width direction. This minimum projection amount wm is a minimum passage width required for rotating the vehicle from a direction at a start of parking to a direction at a completion of parking without considering a turning radius in a space configured by the parking frame and the passage. The passage width wr is compared with the minimum projection amount wm, and when the passage width is smaller than the minimum projection amount, it is determined that the vehicle cannot be parked in the parking frame.

11 Claims, 11 Drawing Sheets

(51) Int. Cl.
  *G06K 9/00* (2006.01)
  *B60W 30/06* (2006.01)
(52) U.S. Cl.
  CPC ......... *B60W 30/06* (2013.01); *B60W 2420/42* (2013.01); *B60W 2420/54* (2013.01); *B62D 15/027* (2013.01)

$wm = w \cos(\alpha - \theta) + \{l - (ws/\sin\alpha) \cdot \cos(\alpha - \theta)\} \cdot \sin(\alpha - \theta)$ $wm = l \sin(\alpha - \theta) + \{w - (ws - l \sin\theta)/\cos\theta\} \cdot \cos(\alpha - \theta)$ $wm = w \cos(\alpha - \theta) + \{l - (ws - w \cos\theta)/\sin\theta\} \cdot \sin(\alpha - \theta)$

PARKING ASSISTANCE DEVICE

TECHNICAL FIELD

The present invention relates to a parking assistance device, for example, to a parking assistance device that detects a space in which a vehicle can be parked based on information from an external environment recognition device such as a camera or a sonar and assists parking of the vehicle in a parking frame.

BACKGROUND ART

Conventionally, there has been a parking assistance device that recognizes surrounding white lines or an obstacle with a camera or a sonar to identify a position of a parking frame large enough for accommodating a host vehicle and a passage space in front of the parking frame. In PTL 1, the steering is set to a maximum turning angle based on a turning trajectory of rear wheels and a front end of the vehicle corresponding to a minimum turning radius of the vehicle, a parking frame width, and an obstacle distance, and the vehicle is reversed. Thus, a reverse switching boundary indicating a boundary where the vehicle can enter a target parking frame at a time is calculated. Then, a presentation image is created by superimposing the reverse switching boundary on a captured image obtained by imaging a periphery of the vehicle. The created presentation image is displayed on a display means.

CITATION LIST

Patent Literature

PTL 1: JP 5151803 B2

SUMMARY OF INVENTION

Technical Problem

However, the parking frame extracted from recognition information is only known to be a space capable of accommodating the host vehicle, and it is necessary to separately confirm whether a route to the parking frame can be generated. If the driver selects a parking frame for which a route cannot be generated and the calculation for a generating a route is performed, the result will be unsuccessful, and the driver will have to select another parking frame, which deteriorates usability. Thus, it is desirable that the driver cannot select a parking frame for which a route cannot be generated as much as possible.

In the parking assistance device of PTL 1 described above, a vehicle guiding means calculates the host vehicle position at which the vehicle can be parked without turning back. Thus, by using the calculation method of PTL 1, it is possible to determine whether a route without turning back can be generated for the parking frame, but it is impossible to determine whether a route involving turning back can be generated for the parking frame.

As one of the methods of determining whether a route can be generated for the parking frame, a method of actually generating a route for each parking frame can be considered. However, generating a route is a process requiring a calculation load, and an accurate route cannot be generated unless the position of the host vehicle at the start of parking control is determined. For the above reason, it is difficult to generate routes for all the parking frames while traveling the host vehicle and searching for the parking frames and then to determine whether routes can be generated for the parking frames.

The present invention has been made in view of such a problem, and an object of the present invention is to provide a parking assistance device capable of easily determining whether a vehicle can be parked in a parking frame.

Solution to Problem

In order to achieve the above object, a parking assistance device according to the present invention assists a vehicle to park in a parking frame disposed on one side of a passage in a passage width direction from the passage through which vehicles can pass, the parking assistance device including a parking space information acquisition device that acquires information on an entrance width of a frame entrance of the parking frame and information on a passage width of the passage, a minimum projection amount calculation device that calculates a minimum projection amount as a minimum passage width required when the vehicle is rotated in a space configured by the parking frame and the passage from a direction of the vehicle at a start of parking to a direction of the vehicle at a completion of parking without considering a turning radius, and a parkability determination device that compares the passage width of the passage with the minimum projection amount, and determines that the vehicle cannot be parked in the parking frame when the passage width of the passage is smaller than the minimum projection amount.

Advantageous Effects of Invention

The parking assistance device of the present invention can easily determine whether the vehicle can be parked in the parking frame with a light load process. It is thus also possible to prevent the driver from selecting a parking frame determined as unparkable by applying the determination of the present invention to all the detected parking frames. This can reduce the probability of occurrence of a situation in which the driver selects a parking frame for which a parking route cannot be generated, a route fails to be generated, and the driver selects a parking frame again.

DESCRIPTION OF EMBODIMENTS

Figure 1:
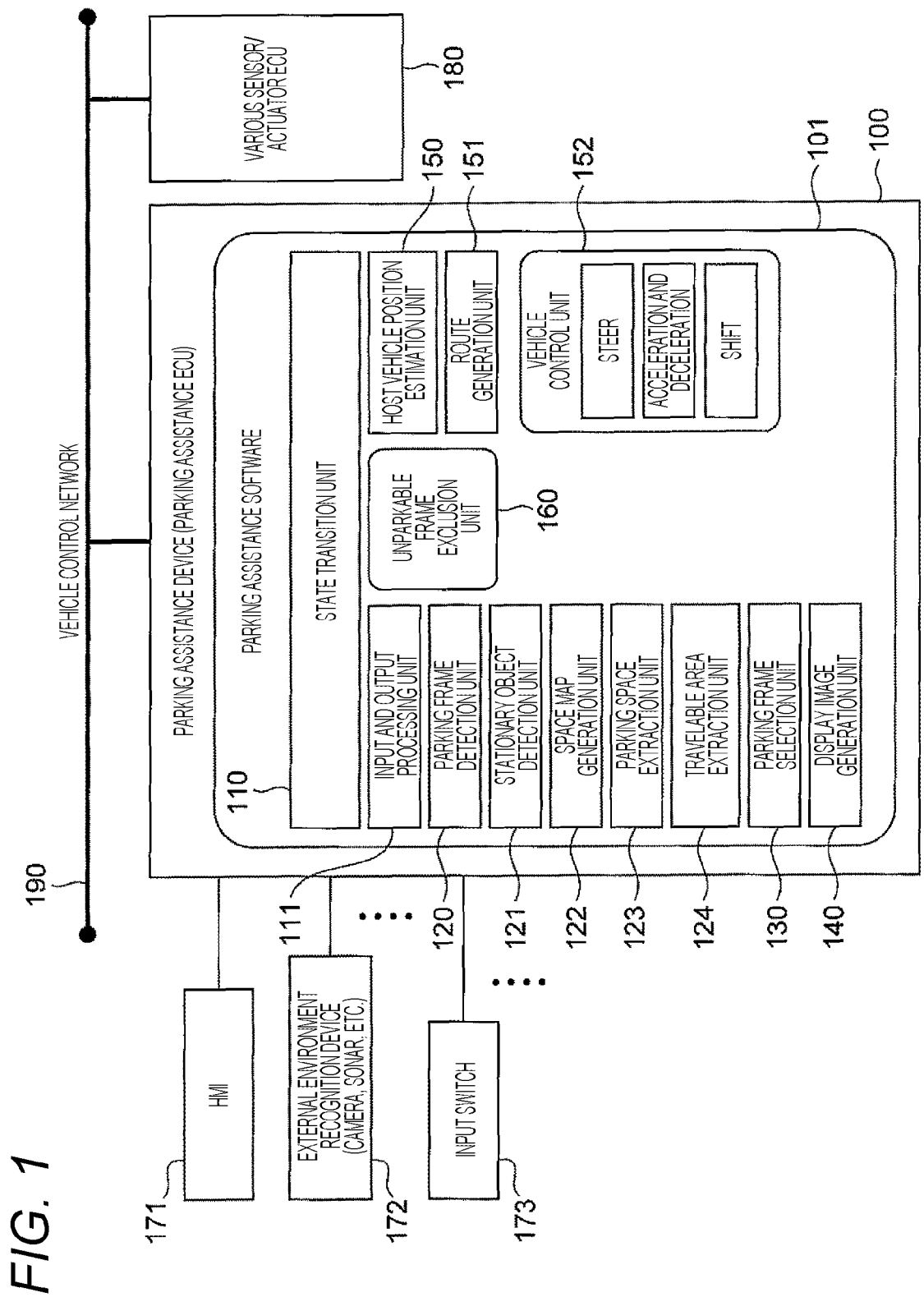
FIG. 1 is a block diagram showing a schematic configuration of one embodiment of a parking assistance device according to the present invention.

Hereinafter, one embodiment of a parking assistance device according to the present invention will be described in detail with reference to the drawings. First, a schematic configuration of the parking assistance device will be described with reference to FIG. 1. FIG. 1 is a block diagram showing the schematic configuration of the parking assistance device according to this embodiment.

In FIG. 1, a parking assistance device 100 according to this embodiment detects a space in which a vehicle can be parked based on information from an external environment recognition device such as a camera or sonar, decides a target parking position from among a plurality of parkable spaces, and allows the vehicle to travel from a parking start position to the target parking position to park.

The present invention relates to the detection of a parkable space and the determination of a target parking position, and thus does not depend on forms of vehicle steering when the vehicle is parked by traveling from the parking start position to the target parking position. The parking assistance device has various forms of how far a system controls the vehicle steering for parking (whether the system fully controls, the system controls only steering, or whether the driven vehicle fully operates the vehicle). However, the present invention can be applied to any form of parking assistance device.

The parking assistance device 100 is configured by an electrical control unit (ECU) and stores parking assistance software 101. The parking assistance device 100 includes a state transition unit 110, an input and output processing unit 111, a parking frame detection unit 120, a stationary object detection unit 121, a space map generation unit 122, a parking space extraction unit 123, a travelable area extraction unit 124, a parking frame selection unit 130, a display image generation unit 140, a host vehicle position estimation unit 150, a route generation unit 151, a vehicle control unit 152, and an unparkable frame exclusion unit 160.

The parking assistance device 100 is connected to a vehicle control network 190 such as a controller area network (CAN), and a various sensor/actuator ECU 180 is connected to the vehicle control network 190. Further, the parking assistance device 100 is connected to a human machine interface (HMI) 171 as an operation input unit, and is also connected to an external environment recognition sensor 172 (camera, sonar, or the like) and an input switch 173. In this embodiment, the HMI 171, the external environment recognition sensor 172 (camera, sonar, or the like), and the input switch 173 are connected by direct signal lines, and the various sensor/actuator ECU 180 is connected through the vehicle control network 190. However, the present invention can be achieved with a different configuration of connection form.

The state transition unit 110 controls operations of the entire parking assistance device 100, transitions its own state based on information from another software processing unit, and determines the next action. Depending on a state of the state transition unit 110, it is determined whether the parking assistance device 100 is currently operating, and when the device is operating, it is determined whether an operation to be performed at this point is detection of a parkable space, a determination of a target parking position, or traveling of the vehicle to the target parking position.

The input and output processing unit 111 inputs to and outputs from various devices outside of the parking assistance device 100 which are connected via direct signal lines and the vehicle control network 190. That is, the input and output processing unit 111 passes input data received from the various devices to other software processing units and transmits output data requested by the other software processing units to the various devices.

The parking frame detection unit 120 detects a parking frame white line marked on a road surface in a parking lot or a parking frame line such as a parking frame rope, based on the information of the external environment recognition sensor 172 (mainly camera information) obtained through the input and output processing unit 111. Information about the detected parking frame is sent to the space map generation unit 122, the parking frame selection unit 130, and the like, which will be described later. Further, the parking frame detection unit 120 may detect an entrance width and depth of a frame entrance of the parking frame, and an intersection angle α between the parking frame and the passage, and may configure a frame type determination device such as perpendicular parking, diagonal parking, and parallel parking.

The stationary object detection unit 121 detects a stationary object such as an object placed in the vicinity, another vehicle parked in the parking space, and a wall, a pillar, or the like separating the parking frame based on the information of the external environment recognition sensor 172 (camera, sonar, or the like) obtained through the input and output processing unit 111. Information on the detected stationary object is sent to the space map generation unit 122 and the like described later.

The space map generation unit 122 obtains relative coordinates of the parking frame detected by the parking frame detection unit 120 and the stationary object detected by the stationary object detection unit 121 with respect to the host vehicle at the time of detection, and coordinates of a position of the host vehicle calculated by the host vehicle position estimation unit 150 with a specific position (for example, a position when a parking support function is activated) as an origin based on the host vehicle position, and stores these coordinates in a space map provided in a memory in the parking assistance device 110.

The parking space extraction unit 123 extracts, as a parking space, a space having at least one side surrounded by a stationary object and having a size large enough for parking the vehicle, based on the space map generated by the space map generation unit 122. As a specific method of determining the space that is large enough for parking the vehicle, a total length l and a total width w of the vehicle are compared with the space surrounded by the stationary object, and it is determined whether the space has a size capable of accommodating the vehicle.

The travelable area extraction unit 124 extracts, as a travelable area, a space that includes no stationary object adjacent to the parking frame or the parking space and adjacent to the host vehicle position, based on the space map generated by the space map generation unit 122. Specifically, a passage 205 is extracted as a travelable area leading to an empty parking frame 203 shown in FIGS. 2 to 4.

The parking frame selection unit 130 determines, as parking frame candidates to be selected, the parking frames that have been detected by the parking frame detection unit 120 and can be determined to include no stationary object in the frame based on the space map generated by the space map generation unit 122, and the parking space extracted by the parking space extraction unit 123. Then, from among the parking frame candidates to be selected, target parking frame candidates that can be selected by the driver and target parking frame candidates that are considered to be most suitable for parking are selected. The parking frame selection unit 130 supplies information on the selected target parking frame candidates to the display image generation unit 140, and also supplies information on a target parking frame finally selected by the driver to the route generation unit 151 and vehicle control unit 152.

The information of the external environment recognition sensor 172 obtained through the input and output processing unit 111 and the information on the target parking frame candidate selected by the parking frame selection unit 130 are subjected to coordinate conversion based on the host vehicle position coordinates output by the host vehicle position estimation unit 150. The display image generation unit 140 generates an image to be displayed on a screen by superimposing the information subjected to coordinate conversion. In addition to the above, for example, a route generated by the route generation unit 151 may be superimposed and displayed.

The host vehicle position estimation unit 150 estimates the position and a yaw angle of the host vehicle with a specific position (for example, a position when the parking support function is activated) as an origin, based on a steering angle, a wheel speed pulse, and a shift position of the host vehicle. This position information is used in the entire system including the space map generation unit 122, the display image generation unit 140, the route generation unit 151, and the vehicle control unit 152. Note that a GPS system of a navigation system and the information of the external environment recognition sensor 172 may be used together to improve the accuracy of host vehicle position information.

The route generation unit 151 generates a route for allowing the vehicle to park in the target parking frame 203, based on the information of the target parking frame selected by the driver, the information of the travelable area adjacent to the parking frame, and the host vehicle position obtained from the host vehicle position estimation unit 150. This route is generated so as to pass through only the inside of a space available for a route generation, the space being configured by the target parking frame and the travelable area.

The vehicle control unit 152 calculates control amounts of a steering operation, an acceleration and deceleration operation, and a shift operation based on the output from the host vehicle position estimation unit 150 and the route generation unit 151, performs the operations, and moves the vehicle to within the target parking frame. Specifically, the vehicle control unit 152 activates an electric steering with the calculated control amount to steer in the steering operation, and controls driving force and braking force with the calculated control amount to accelerate and decelerate the vehicle in the acceleration and deceleration operation, and switches the shift position of the vehicle based on a calculated traveling direction in the shift operation.

As described above, the driver may operate the vehicle instead of the parking assistance device 100 controlling some or all of the functions of the vehicle control unit 152. In any case, the present invention is applicable.

The unparkable frame exclusion unit 160 is a software processing unit that performs processes characteristic of this embodiment.

The unparkable frame exclusion unit 160 calculates a minimum projection amount wm of every parking frame candidate to be selected in the parking frame selection unit 130 as a minimum passage width required for rotating the vehicle without considering a turning radius from a direction of the vehicle at the start of parking to a direction of the vehicle at the completion of parking in a space configured by the parking frame and the passage.

Then, the minimum projection amount wm is compared with a width wr of the passage 205 to determine whether the vehicle cannot be parked. That is, when the passage width wr is smaller than the minimum projection amount wm, it is determined that the vehicle cannot be parked in the parking frame. At this time, when the calculated minimum projection amount wm is smaller than the total width w of the vehicle, the total width of the vehicle is set as the minimum projection amount. The parking frame determined to be unparkable is excluded from the parking frame candidates to be selected in the parking frame selection unit 130.

This unparkable frame exclusion process may be performed only for a newly found parking frame. However, a stationary object or a parking frame detected based on the information of the external environment recognition sensor 172 can change as the host vehicle moves or time elapses, and it is thus desirable to execute the unparkable frame exclusion process anew every time the vehicle has moved a certain distance or every time a certain time has elapsed.

The unparkable frame exclusion process performed by the parking unparkable frame exclusion unit 160 does not generate a route which takes a long time to calculate. This enables determination of whether the vehicle can be parked by a light load process. As a result, whether being performed for all the parking frame candidates to be selected in the parking frame selection unit 130 or being performed every time the vehicle has moved a certain distance or every time a certain time has elapsed, the unparkable frame exclusion process can be performed with only a slight increase in processing load.

When a stationary three-dimensional object 206 such as a side wall configuring the passage space of the passage 205 is present, it is preferable to add a minimum required margin between the vehicle and the stationary three-dimensional object. Similarly, it is preferable to add a minimum required margin between the vehicle and an entrance end 203a on a first side and an entrance end 203b on a second side of the parking frame in a frame width direction. By adding the minimum required margin, it is possible to avoid contact between the vehicle and the stationary three-dimensional object and to reliably prevent damage to the vehicle, a side wall, and the like.

Figure 2:
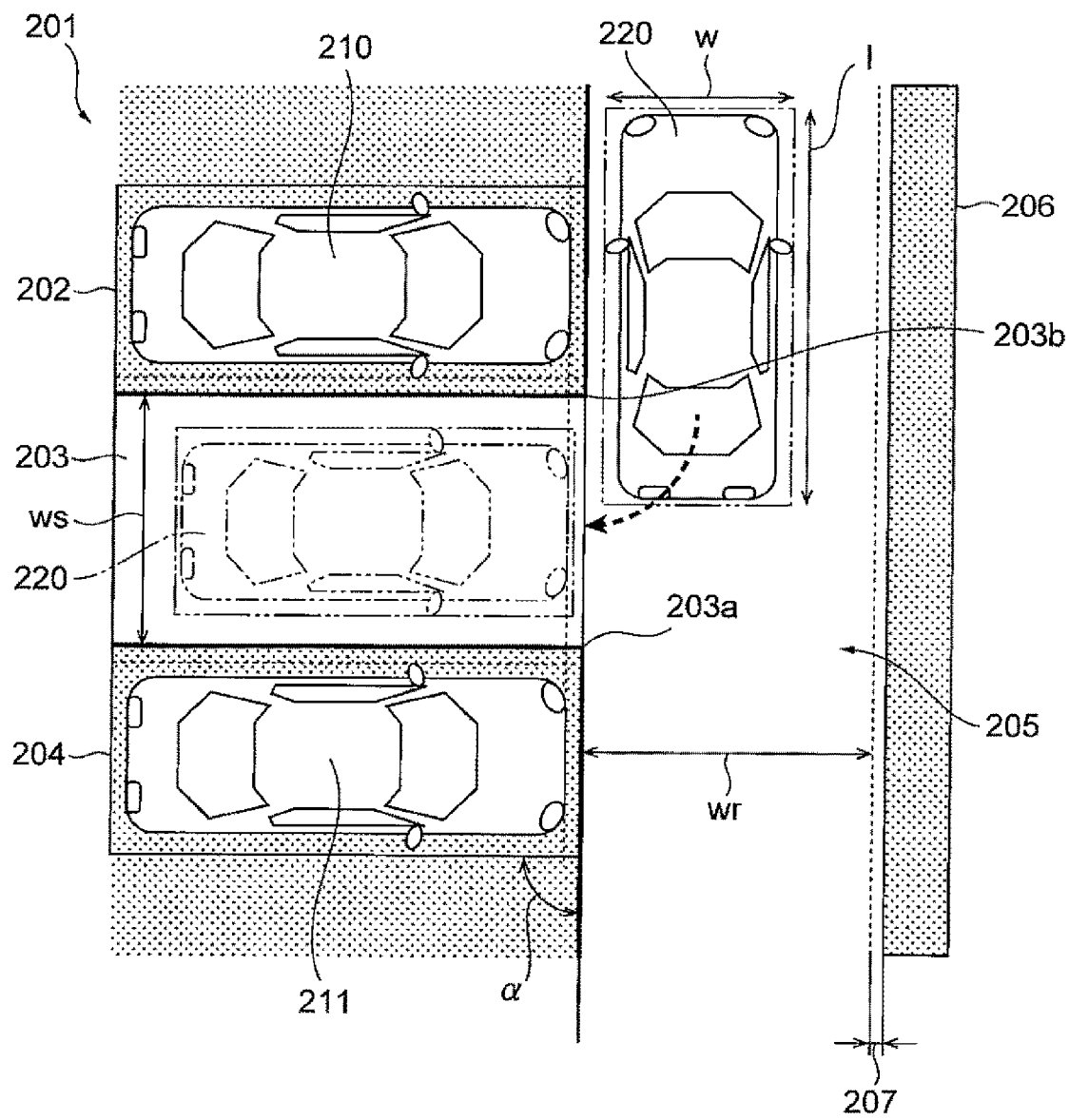
FIG. 2 is a plan view showing a positional relationship between a vehicle, a parking frame, and a passage at a start of parking when the vehicle is parked in the parking frame set perpendicular to the passage.

Next, a positional relationship between the parking frame, the passage, and the vehicle of the parking lot to which the parking assistance device 100 of this embodiment is applied will be described with reference to FIGS. 2 to 6. In FIG. 2, a plurality of parking frames 202, 203, and 204 are divided by white lines or the like in a parking lot 201. These parking frames 202, 203, and 204 are disposed on one side of the passage 205 in the passage width direction through which vehicles can pass. The passage width wr of the passage 205 is determined by a side wall 206, and the intersection angle α between a longitudinal direction of the passage 205 and a depth direction of the parking frame is 90 degrees. Note that, in FIGS. 3 and 4, the parking frames 202 and 204 adjacent to the parking frame 203 in which the vehicle 220 is to be accommodated are shown as inaccessible areas.

This parking lot 201 is for perpendicular parking, and the intersection angle α between the passage 205 and the longitudinal direction of the parking frame 203 is 90 degrees. Thus, the vehicle passes through the passage 205 to be parked in the target parking frame 203 rearward or forward. In FIG. 2, the passage width wr is set with a margin 207 for the side wall 206.

In the parking lot 201, a continuous space configured by connecting the empty space of the specific parking frame 203 and the space of the passage 205 is formed in a T-shape, and this T-shaped continuous space is a space available for generating a route for the vehicle to park in the parking frame.

The operations of the parking assistance device 100 of this embodiment configured as described above will be described below with reference to FIGS. 2 to 6. In a state of FIG. 2, other vehicles 210 and 211 are parked in the parking frames 202 and 204, respectively, and the parking frame 203 at a middle position is empty. The entrance width of the frame entrance of the empty parking frame 203 is set to ws. A case where the vehicle 220 is parked rearward in this empty parking frame 203 will be described below. The vehicle 220 has a total length of l and a total width of w.

The driver causes the vehicle 220 to enter the parking lot 201, pass through the passage 205 connected to the plurality of parking frames, move to the vicinity of the frame entrance of the empty parking frame 203, and stop. Then, operating the input switch 173 of the parking assistance device 100 makes the input and output processing unit 111 function and executes the parking assistance software 101. The parking assistance device 100 estimates the position of the vehicle 220 in the parking lot 201 using the steering angle, the wheel speed pulse, and the like.

The parking assistance device 100 detects the parking frame 203 as a space in which the vehicle 220 can be parked, by the parking frame detection unit 120 based on the information from the external environment recognition sensor 172. Further, the stationary object detection unit 121 detects any stationary objects around the vehicle. The stationary object is, for example, a luggage, a bicycle, or the like placed in an adjacent parking frame, another parked vehicle, or a pylon, which is to be detected.

Next, the space map generation unit 122 generates a space map including the parking frame 203 detected by the parking frame detection unit 120 and the stationary object detected by the stationary object detection unit 121. Then, using the generated space map, it is confirmed whether there is a stationary object in the parking frame 203 detected by the parking frame detection unit 120. Further, the parking space extraction unit 123 extracts a parking space surrounded by the stationary object based on the generated space map.

Further, when it is confirmed that there is no stationary object in the parking frame 203 detected by the parking frame detection unit 120, or when the parking space is detected by the parking space extraction unit 123, the travelable area for the vehicle 220 located on the passage 205 to park in the parking frame 203 or the parking space is extracted by the travelable area extraction unit 124.

Figure 4:
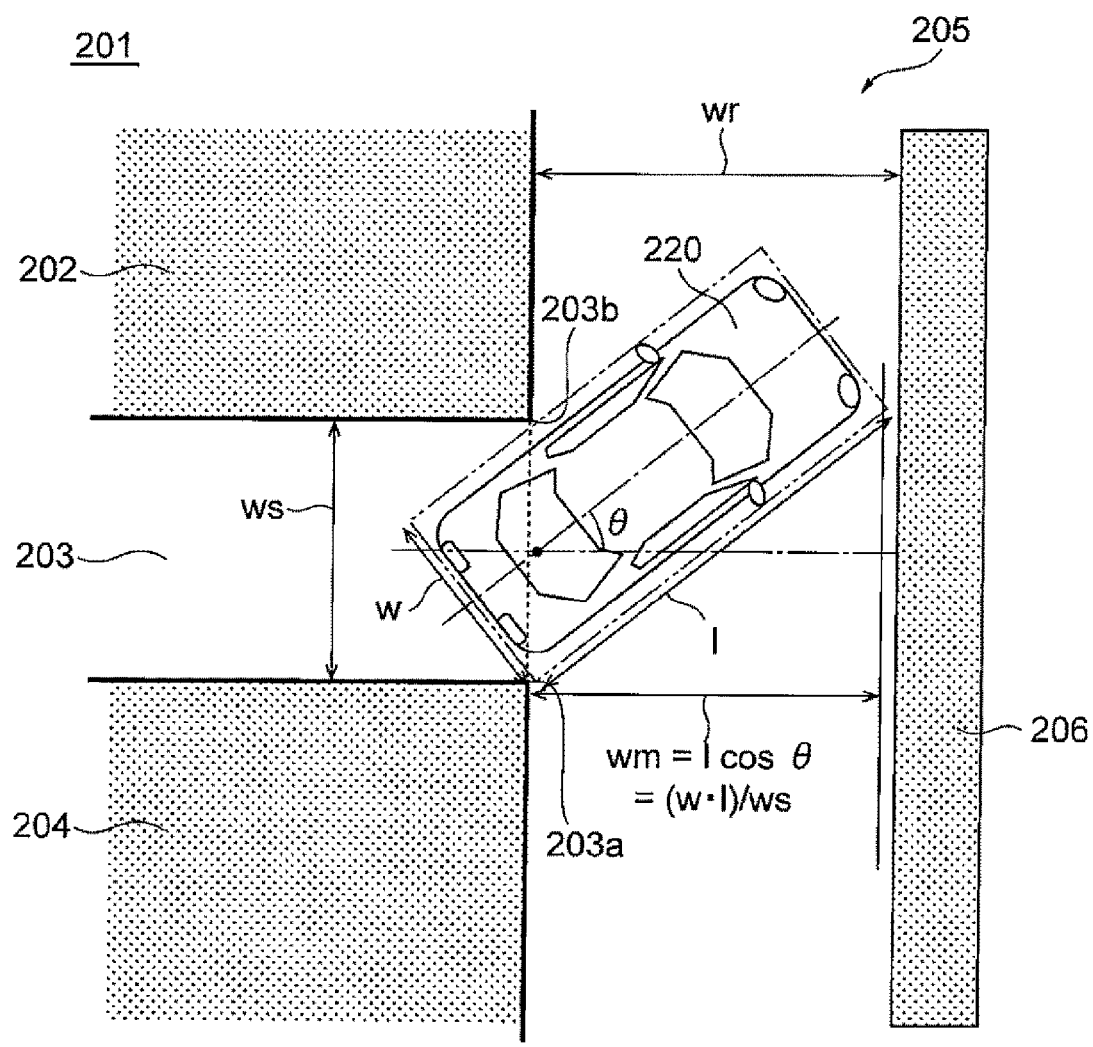
FIG. 4 is a plan view showing that a projection amount in the passage width direction of the vehicle projecting from the parking frame to the passage is approximately maximum when the vehicle is rotated from the yaw angle at the start of parking to the yaw angle at the completion of parking as close as possible to the parking frame in the perpendicular parking shown in FIG. 2.

In the unparkable frame exclusion unit 160, as shown in FIG. 4, when the vehicle total width of the vehicle 220 is w, the vehicle total length of the vehicle 220 is l, the entrance width (lateral width) of the frame entrance of the parking frame is ws, and an angle between a front-back direction of the parking frame and the longitudinal direction of the passage (intersection angle between the depth direction of the parking frame and the longitudinal direction of the passage) is a, the minimum projection amount wm as the minimum passage width required for rotating the vehicle without considering the turning radius from the direction of the vehicle at the start of parking to the direction of the vehicle at the completion of parking is calculated by the following formula (1).

$$wm = (w \cdot l \sin \alpha)/ws \qquad (1)$$

In formula (1), in perpendicular parking, a projection amount in the passage width direction of the vehicle 220 from the parking frame 203 to the passage 205 when a vehicle corner on a front side of the vehicle 220 in an approach direction to the parking frame 203 and on a first side in a vehicle width direction is located at the entrance end 203a on the first side of the parking frame 203 in the frame width direction, and when the vehicle is disposed at a position where the vehicle side part on a second side of the vehicle in the vehicle width direction is in contact with the entrance end 203b on the second side of the parking frame 203 in the frame width direction is calculated as the minimum projection amount wm.

For example, as indicated by a thick broken arrow in FIG. 2, in order to move the vehicle 220 located on the passage 205 to a position where the vehicle 220 is accommodated in the parking frame 203 and complete parking, the yaw angle of the vehicle 220 needs to be rotated from a direction along the passage 205 to a direction for accommodating the vehicle in the parking frame 203. In order to park the vehicle without invading the adjacent parking frames and without contacting the surrounding stationary object, this rotation needs to be performed inside the T-shaped space configured by the parking frame 203 and the passage 205.

Figure 3:
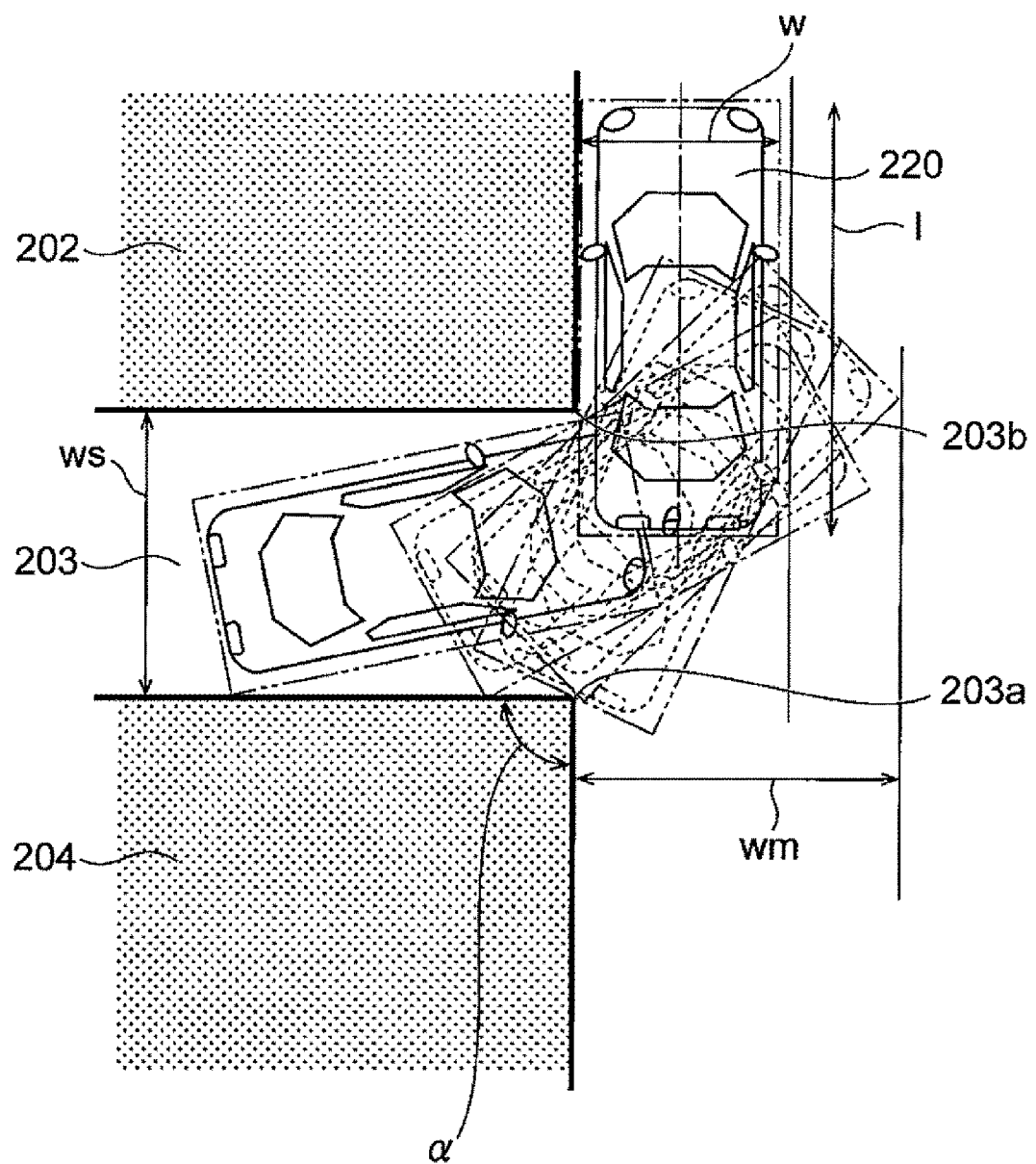
FIG. 3 is a plan view showing a change in a projection amount in a passage width direction of the vehicle projecting from the parking frame to the passage when the vehicle is rotated from a yaw angle at the start of parking to a yaw angle at the completion of parking, keeping the vehicle as close as possible to the parking frame in a perpendicular parking shown in FIG. 2.

The minimum required passage width for rotating the vehicle in the T-shaped space as described above is a maximum value of the projection amount of the vehicle projecting to the passage when the vehicle 220 rotated at an arbitrary yaw angle from the direction along the passage 205 to the direction for accommodating the vehicle in the parking frame 203 is put as close to the parking frame 203 as possible in the T-shaped space as shown in FIG. 3 (this maximum value of the projection amount is called the minimum projection amount). Without securing the passage width of this minimum projection amount, the vehicle cannot be parked in the parking frame 203 no matter how many times the steering wheel is turned.

In perpendicular parking at α=90°, as shown in FIG. 4, a projection amount can be regarded the minimum projection amount when a vehicle rear end corner on an outer side during turning (outer side) as the first side of the vehicle 220 in the vehicle width direction is located at the entrance end 203a on the first side of the frame entrance of the parking frame 203 in the frame width direction, and a side on the vehicle side of an inner side during turning (inner side) as the second side of the vehicle 220 in the vehicle width direction is disposed at a position contacting the entrance end 203b on the second side of the frame entrance in the frame width direction. An angle θ between the direction of the vehicle 220 and the depth direction of the parking frame at that time is represented by θ=arccos(w/ws), and the minimum projection amount can be calculated by wm−(w·l)/ws.

Note that this calculation formula is satisfied when w≤ws<√(w²+l²). When ws<w, the vehicle 220 cannot be accommodated in the parking frame 203. When ws≥√(w²+l²), the vehicle 220 can be rotated only in the parking frame 203, and thus the minimum projection amount required for rotating the vehicle 220 is zero. In this case, since it is sufficient to secure a passage width that allows the vehicle 220 to move back and forth to an appropriate parking start position, the minimum projection amount can be considered as the vehicle total width w. Also, when w ws<√(w²+l²), and when wm=(w·l)/ws is smaller than w, the minimum projection amount is regarded as the vehicle total width w for a similar reason.

The minimum projection amount wm of the vehicle 220 in the passage width direction thus calculated is compared with the actual passage width wr. When the passage width wr is narrower, the unparkable frame exclusion unit 160 determines that the vehicle 220 cannot be parked in the parking frame 203.

Thus, as shown in FIG. 4, in perpendicular parking, the projection amount wm is obtained by dividing the product of the vehicle total length l and the vehicle total width w by the lateral width ws of the parking frame (entrance width of the frame entrance). For example, the projection amount wm for accommodating a vehicle having a total length of 5 m and a total width of 2 m in a parking frame having a lateral width of 2.5 m is (5×2)/2.5=4, and it can be easily and quickly determined that the actual passage width wr needs to be equal to or more than 4 m in order to park the vehicle.

The minimum projection amount obtained by the method of the present invention can be interpreted as a passage width required for parking the vehicle 220 from inside of the passage 205 to the parking frame 203 when an infinite number of times of turning back and an infinitesimal moving distance by turning back are allowed. In this case, a minimum turning radius can be ignored, and thus parkability can be determined using only the minimum projection amount by a simple calculation formula considering only whether the vehicle can be rotated in the T-shaped space. However, in the actual route generation, the number of times of turning back is finite, and thus a certain moving distance is required for turning back, and the minimum turning radius needs to be considered. For the parking frame determined as unparkable based on the minimum projection amount obtained by the method of the present invention, a route cannot be generated, but the opposite is not true. That is, for the parking frame determined as not unparkable based on the minimum projection amount obtained by the method of the present invention, route generation may not be possible.

In relation to the above description of the operations, the process performed for each parking frame by the unparkable frame exclusion unit 160 according to this embodiment will be described with reference to FIG. 7. This process is performed when a parking frame is newly detected, and after the vehicle has traveled a certain distance (or after a certain time has elapsed) since the same process was previously performed.

Figure 7:
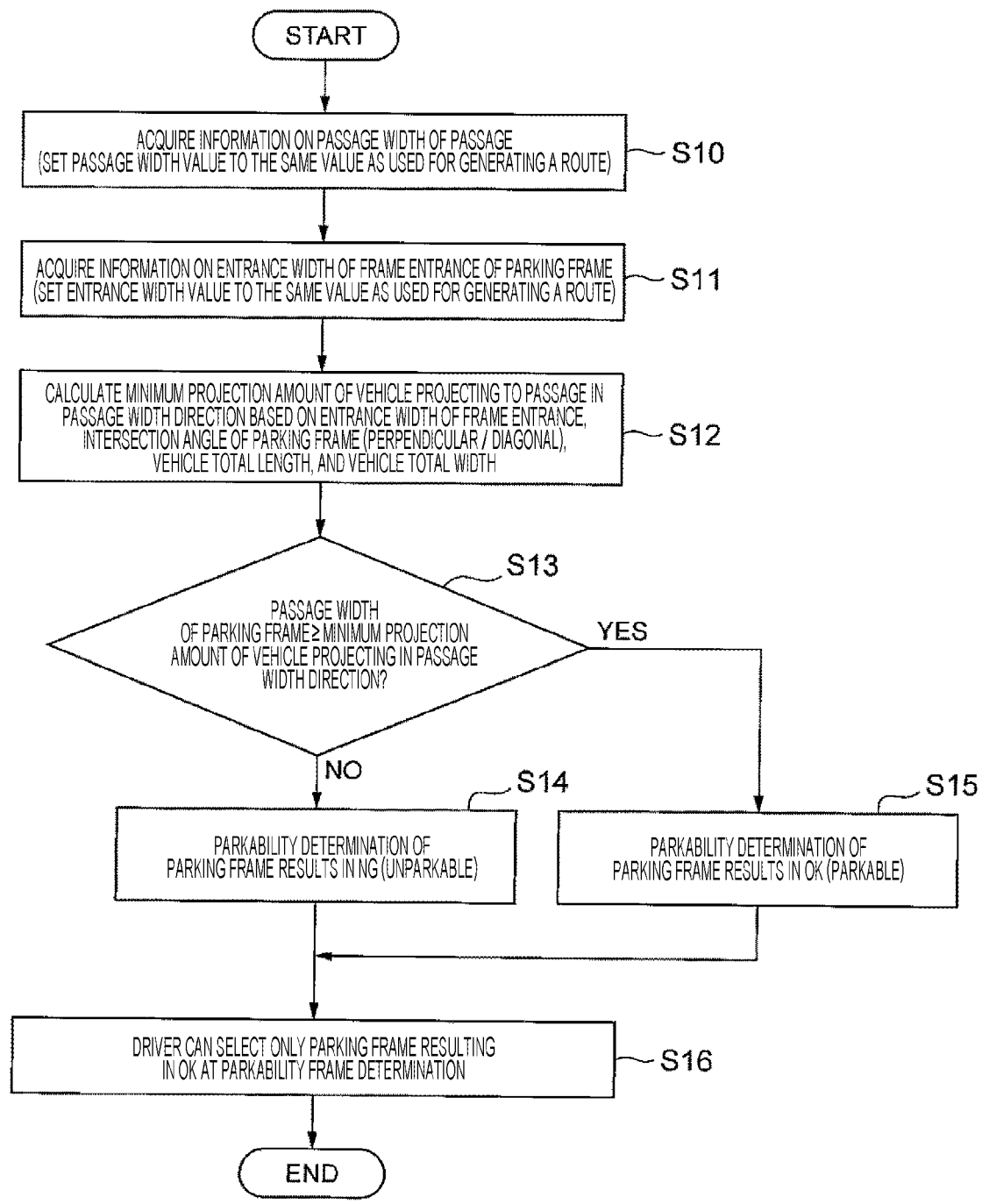
FIG. 7 is a flowchart showing a process of determining whether the vehicle can be parked in a detected parking frame and making it impossible for the driver to select the detected parking frame when the vehicle cannot be parked in the above-mentioned embodiment.

When the process of FIG. 7 is performed for the parking frame 203, the passage width wr of the corresponding parking frame 203 is acquired in step S10. The passage width wr is calculated by the travelable area extraction unit 124 based on the space map, and is a value common to the passage width used by the route generation unit 151.

Then, in step S11, the entrance width ws of the frame entrance of the corresponding parking frame 203 is acquired. The entrance width ws is determined based on the white line detected when the parking frame detection unit 120 detects the parking frame, or an adjacent obstacle detected when the parking space extraction unit 123 extracts the parking space, and is a value common to the entrance width used by the route generation unit 151. Then, in step S12, the minimum projection amount wm in the passage width direction of the vehicle projecting to the passage is calculated based on the entrance width ws of the frame entrance, the intersection angle α of the parking frame (perpendicular parking/diagonal parking/parallel parking), the vehicle total length l, the vehicle total width w, and the margin.

In step S13, the passage width wr of the passage 205 of the parking lot 201 is compared with the calculated minimum projection amount wm, and it is determined whether the passage width wr of the passage 205 of the parking lot 201 is the minimum projection amount wm or more. When the passage width wr of the passage 205 of the parking lot 201 is not equal to or larger than the minimum projection amount wm, that is, when the minimum projection amount wm is larger than the passage width wr, a result of a parkability frame determination of the corresponding parking frame is "NG" and unparkable in step S14.

When the passage width wr of the passage 205 of the parking lot 201 is equal to or larger than the minimum projection amount wm, that is, when the minimum projection amount wm is equal to or smaller than the passage width wr, a result of the parkability frame determination of the corresponding parking frame is "OK" and parkable in step S15. Then, in step S16, the driver can select only the corresponding parking frame resulted in "OK" at the parkability frame determination.

Figure 5:
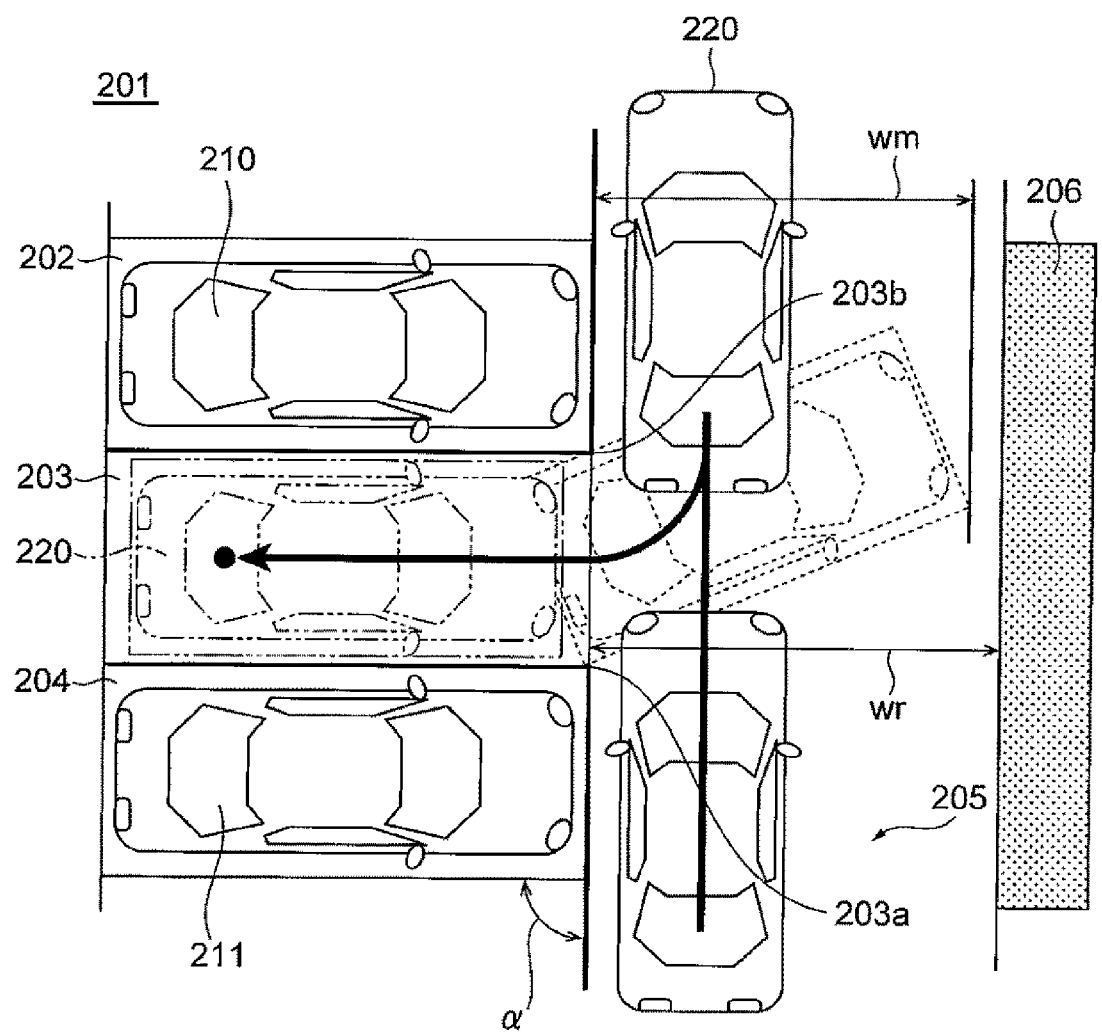
FIG. 5 is a plan view showing a relationship between the passage width and a minimum projection amount in the perpendicular parking shown in FIG. 2, the relationship being determined as not unparkable by the parking assistance device of the present invention.

In the plan view of the parking lot 201 shown in FIG. 5, the actual passage width wr is larger than the calculated minimum projection amount wm, and thus it can be confirmed that there is a minimum passage width required for rotating the vehicle 202 from a direction at the start of parking to a direction at the time of accommodating the vehicle 220 in the parking frame 203. Therefore, it can be determined that there is a possibility that the vehicle 220 can be parked in this parking frame 203, that is, there is a possibility that a route for parking can be generated. As described above, even when it is determined that the vehicle can be parked based on the minimum projection amount wm, a route may not be actually generated in some cases in a route generation considering an upper limit of the number of times of turning back, the minimum turning radius, and the like.

Figure 6:
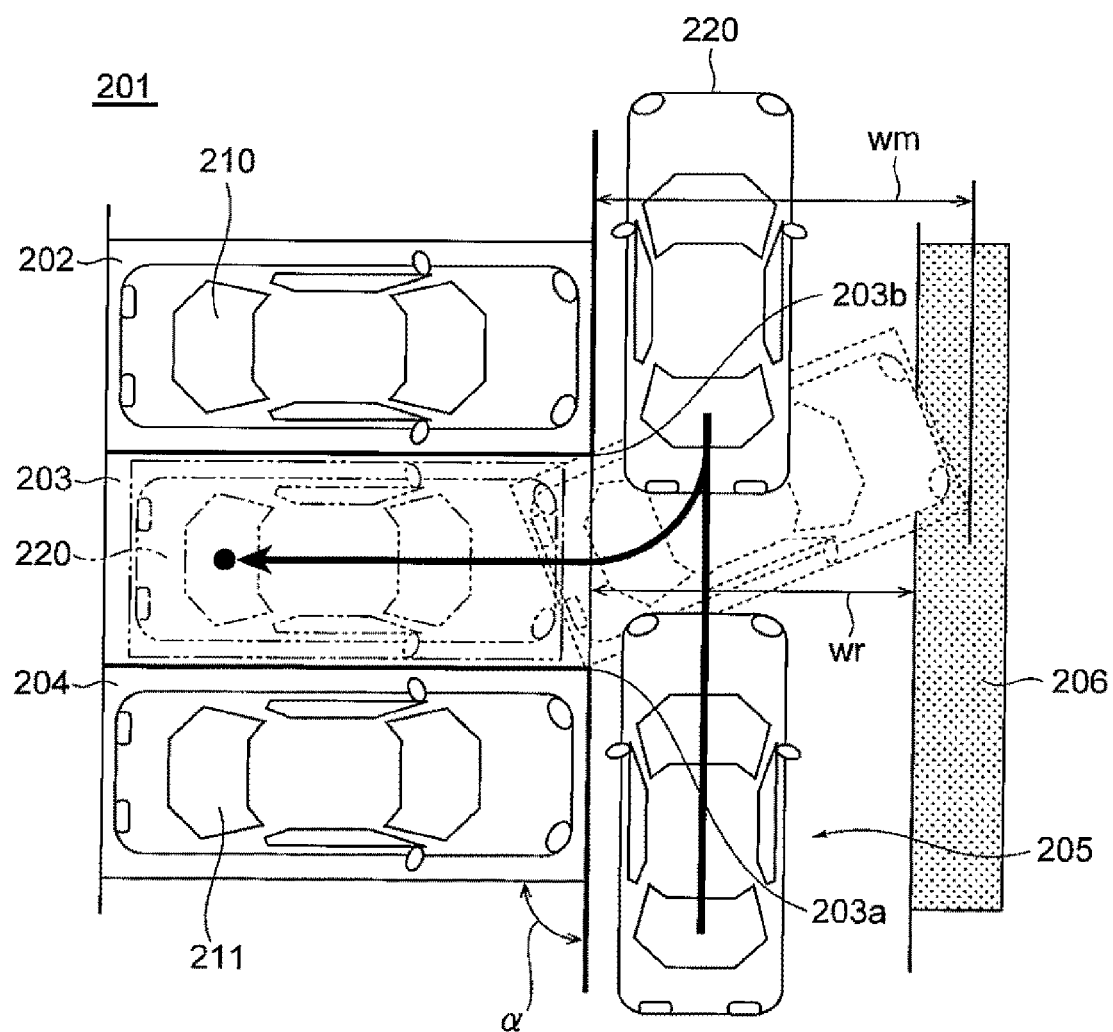
FIG. 6 is a plan view showing a relationship between the passage width and the minimum projection amount in the perpendicular parking shown in FIG. 2, the relationship being determined as unparkable by the parking assistance device of the present invention.

Further, in the plan view of the parking lot 201 shown in FIG. 6, the actual passage width wr is smaller than the calculated minimum projection amount wm, that is, the minimum projection amount wm is larger than the passage width wr, and thus it can be confirmed that the vehicle 220 contacts the side wall 206 of the passage 205 when the vehicle is rotated from the direction at the start of parking to the direction at the time of accommodating the vehicle 220 in the parking frame 203. As a result, it can be determined that the vehicle 220 cannot be parked in the parking frame 203, and a route for parking cannot be generated even if an infinite number of times of turning back is allowed. Thus, this parking frame is excluded from selection objects of the target parking frame.

For the determination of whether the vehicle can be parked in the empty parking frame 203, the parkability can be determined in a short time when the minimum projection amount wm is calculated in advance and stored in a storage device as a numerical table having the entrance width ws of the parking frame 203 and the intersection angle α between the longitudinal direction of the passage 205 and the depth direction of the parking frame as vertical and horizontal axes.

The parking frame excluded from the selection objects by the unparkable frame exclusion unit 160 does not appear in options when the driver selects the target parking frame on the screen. This can reduce the probability of occurrence of a situation in which the driver selects a parking frame for which a route cannot be generated as the target parking frame and a route fails to be generated.

In this way, in the parking assistance device 100 according to this embodiment, first, the minimum projection amount wm in the passage width direction of the vehicle is calculated, and whether the minimum projection amount wm is smaller than the passage width wr is determined. It is therefore possible to easily determine whether the vehicle cannot be parked in the parking frame. This makes it possible to prevent many of the parking frames for which a route cannot be generated from being selected as the target parking frame without a calculation for generating a route which requires a great deal of processing time for all the detected parking frames.

The calculation of the minimum projection amount wm for each parking frame, which takes significantly shorter time than the calculation for generating a route, can be performed periodically for every detected parking frame using a processor with a normal processing capacity.

Although the flow of each process is shown as an example in the above description of the operations, the present invention is not limited thereto, and the order of the processes can be changed. As characteristics of this embodiment, for each of the detected parking frames, the minimum projection amount wm in the passage width direction of the vehicle is calculated, and it is determined whether the minimum projection amount wm is equal to or smaller than the passage width wr. The target parking frame can only be selected when the minimum projection amount wm is equal to or smaller than the passage width wr, and the order of other processes is not particularly limited.

Figure 9:
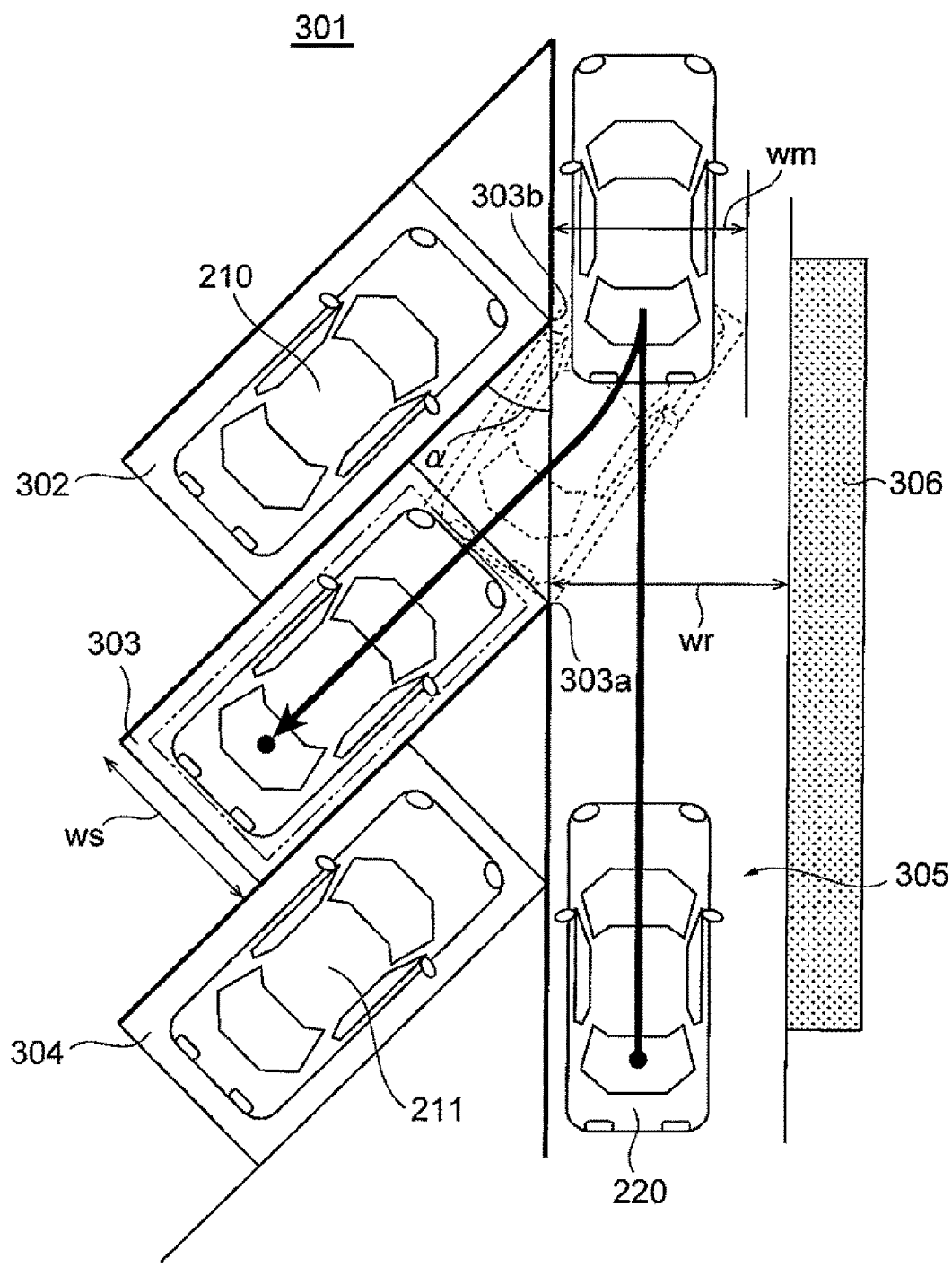
FIG. 9 is a plan view showing a relationship between the passage width and the minimum projection amount in a diagonal parking shown in FIG. 8, the relationship being determined as not unparkable by the parking assistance device of the present invention.
Figure 10:
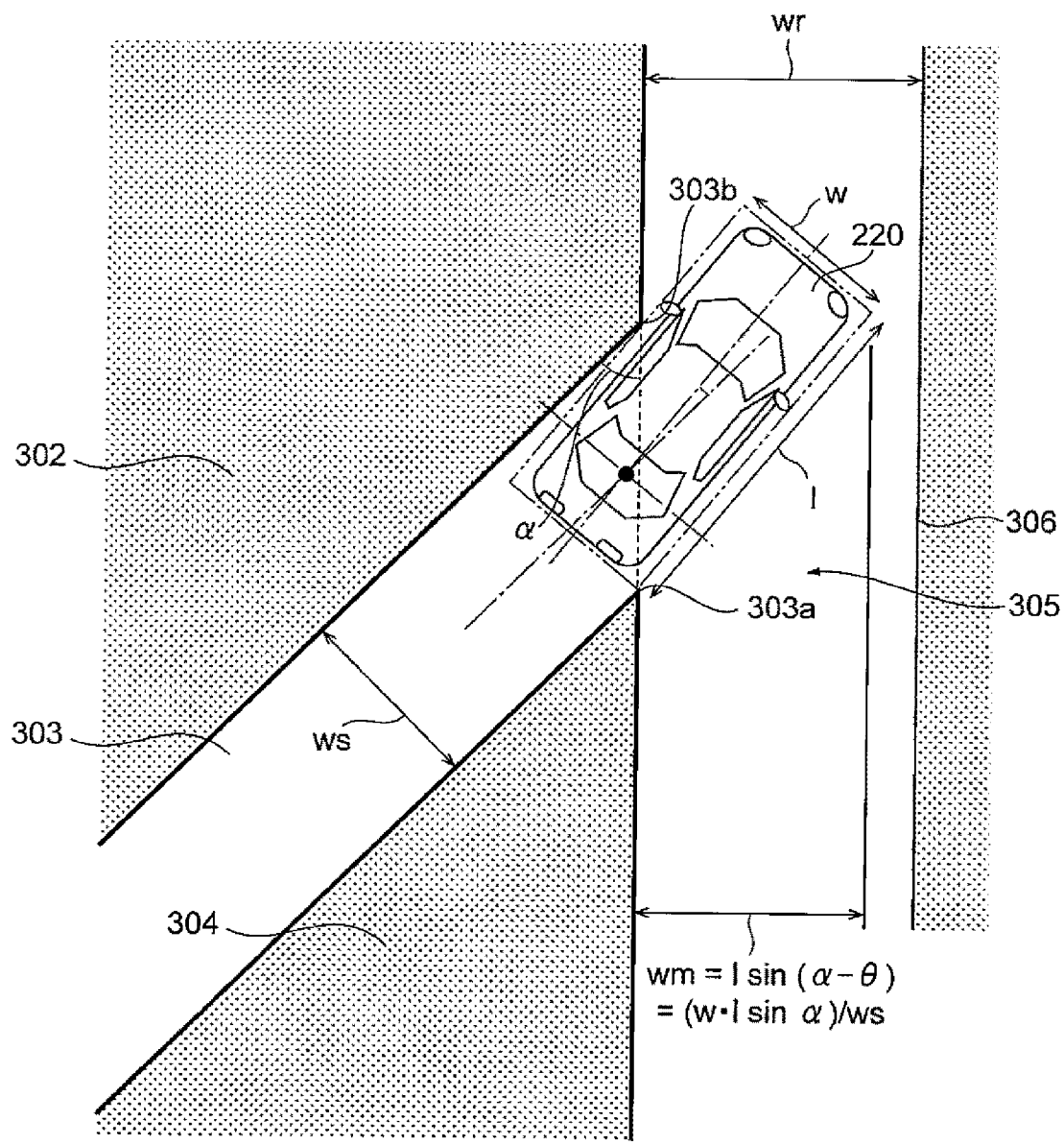
FIG. 10 is a plan view showing that a projection amount in the passage width direction of the vehicle projecting from the parking frame to the passage is maximum when the vehicle is rotated from the yaw angle at the start of parking to the yaw angle at the completion of parking, keeping the vehicle as close as possible to the parking frame in the diagonal parking shown in FIG. 8.

The above description of the operations has been made in a case where the intersection angle α between the longitudinal direction of the passage and the depth direction of the parking frame is 90 degrees. The diagonal parking where a is not 90 degrees (about 45 degrees in FIG. 8) will be described below with reference to FIGS. 8 to 10. In the following description, the same reference numerals will be given to configurations that are substantially the same as in the case where the intersection angle α between the longitudinal direction of the passage and the depth direction of the parking frame is 90 degrees, and detailed description thereof will be omitted.

Figure 8:
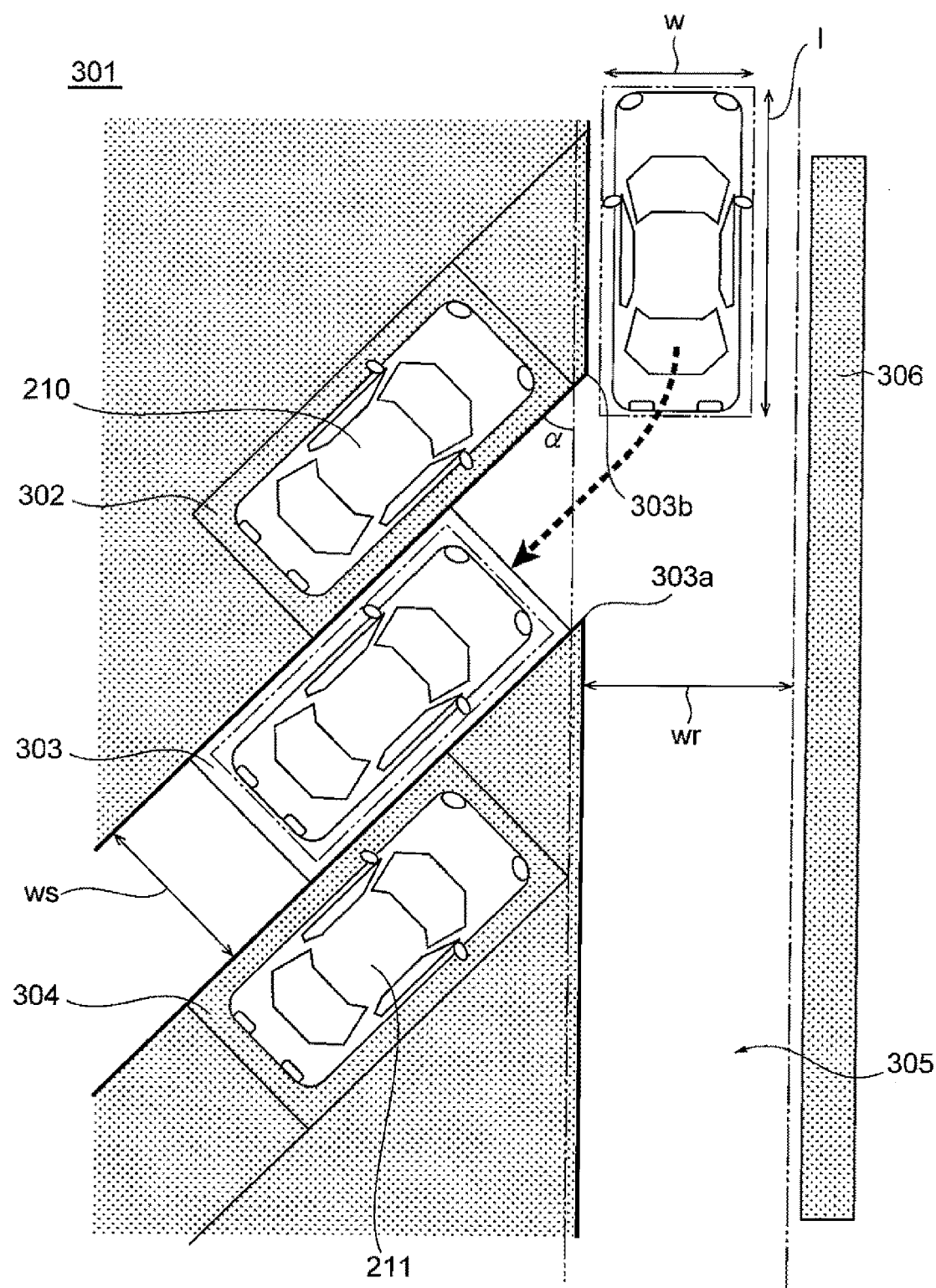
FIG. 8 is a plan view showing a positional relationship between a vehicle, a parking frame, and a passage at a start of parking when the vehicle is parked in the parking frame set diagonal to the passage.

In a parking lot 301 shown in FIG. 8 and others, a plurality of parking frames 302, 303, and 304 are divided by white lines or the like. These parking frames are disposed on one side (left side) of a passage 305 in the passage width direction through which vehicles can pass. The passage width wr of the passage 305 is determined by a side wall 306, and the intersection angle α between a longitudinal direction of the passage and a depth direction of the parking frame is about 45 degrees.

This parking lot 301 is for diagonal parking, and the intersection angle α between the passage 305 and the longitudinal direction of the plurality of parking frames is 45 degrees. Thus, the vehicle 220 enters through the passage 305 to park rearward to the target parking frame in the parking lot 301. In FIG. 8, the passage width wr is set with a margin with respect to the side wall 306 and entrance ends 303a and 303b of the parking frame, but the margin is not always necessary. The intersection angle α can be arbitrarily set within a range of 0 to 90 degrees. The intersection angle α of 0 degrees is for parallel parking, and the intersection angle α of 90 degrees is for perpendicular parking as described above.

In the parking lot 301, the continuous space configured by connecting the space of the specific parking frame 303 and the space of the passage 305 is formed in an inverted shape of Japanese katakana letter "to". This continuous space having an inverted shape of Japanese katakana letter "to" is a space available for generating a route for parking the vehicle 220 in the parking frame 303. Note that, in FIG. 10, the parking frames 302 and 304 adjacent to the parking frame 303 in which the vehicle 220 is to be accommodated are shown as inaccessible areas.

The minimum projection amount wm in this case can be calculated by formula (1) as shown in the description of perpendicular parking.

$$wm=(w \cdot l \sin \alpha)/ws \qquad (1)$$

However, formula (1) can be applied only when $ws \leq w s < \sqrt{(w^2+l^2)} \cdot \sin \alpha$. When $\sqrt{(w^2+l^2)} \cdot \sin \alpha \leq ws < \sqrt{(w^2+l^2)}$, a diagonal line of the vehicle 220 is closer to the parking frame 303 than a contact side of the parking frame 303 and the passage 305, and the vehicle 220 cannot be rotated in the parking frame from a direction of the passage 305 to a direction of the parking frame 303. In this case, the minimum projection amount wm can be calculated by the following formula (2).

$$wm=l \sin(\alpha-\arcsin(ws/\sqrt{(w^2+l^2)})+\arctan (w/l)) \qquad (2)$$

The case where ws<w and the case where $ws \geq \sqrt{(w^2+l^2)}$ are taken similarly to perpendicular parking (α=90°). Further, in the case where $w \leq ws < \sqrt{(w^2+l^2)}$, when the minimum projection amount wm calculated by formula (1) or (2) is smaller than the vehicle total width w, the vehicle total width w is regarded as the minimum projection amount wm similarly to perpendicular parking.

FIG. 11 is a diagram for explaining that the minimum projection amount wm can be expressed by formula (1).

When the vehicle 220 is rotated from the direction of the passage 305 to the direction of the parking frame 303 while being kept as close as possible to the parking frame 303 within the inverted "to"-shaped space, a boundary line of the inverted "to"-shaped space and the vehicle 220 contact each other. The forms of this contact can be classified into three patterns shown in FIGS. 11(a) to 11(c).

Figure 11A:
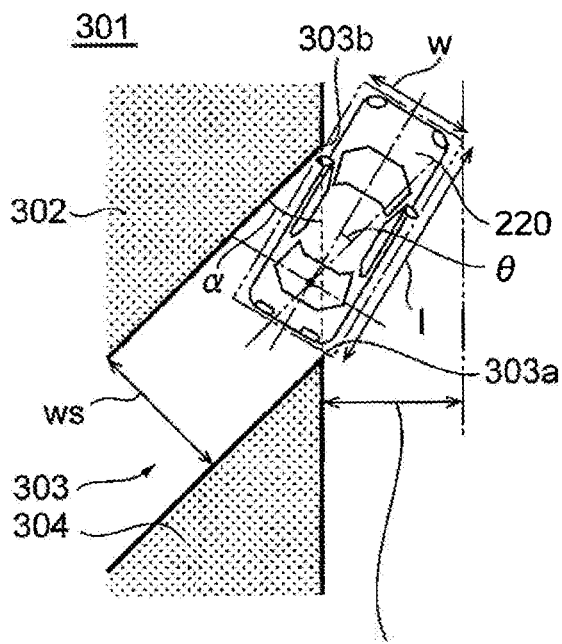
FIGS. 11(a) to 11(c) are plan views showing patterns of positional relationship between the vehicle and a space configured by the passage and the parking frame when the vehicle is rotated from the yaw angle at the start of parking to the yaw angle at the completion of parking, keeping the vehicle as close as possible to the parking frame.

In FIG. 11(a), a rear side of the vehicle 220 (front side in the approach direction of the vehicle) is in contact with an entrance end 303a on one side of the frame entrance of the parking frame 303, and a side on the inner side (inner side during turning) of the vehicle is in contact with an entrance end 303b on the other side of the frame entrance. At this time, a condition where w≤ws<w sin α/sin (α−θ) and ws≤l sin α/cos (α−θ) is satisfied, and the projection amount wm in this case can be calculated by the following formula (3).

$$wm = w \cos(\alpha-\theta) + \{l-(ws/\sin \alpha)\cdot\cos(\alpha-\theta)\}\cdot\sin(\alpha-\theta) \quad (3)$$

Figure 11B:
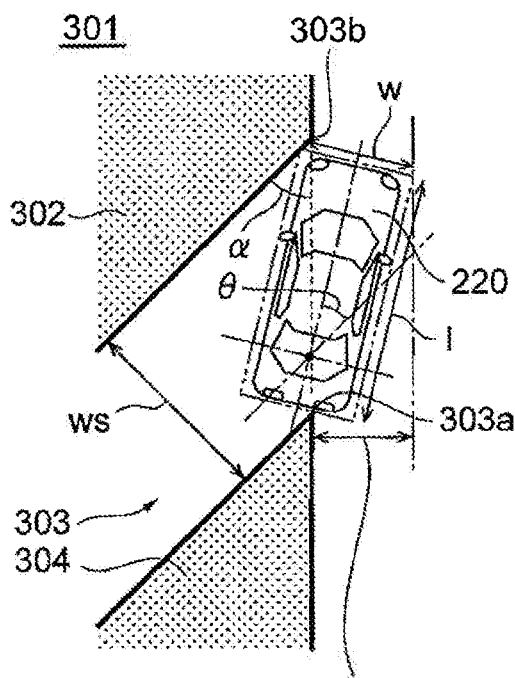

In FIG. 11(b), the rear side of the vehicle 220 (front side in the approach direction of the vehicle) is in contact with the entrance end 303a on one side of the frame entrance of parking frame 303, and the corner on the inner side (inner side during turning) of the vehicle is in contact with an internal side on the other side of the frame entrance. At this time, a condition where w≤ws<w sin α/sin (α−θ) and ws>l sin α/cos (α−θ) is satisfied, and the projection amount wm in this case can be calculated by the following formula (4).

$$wm = l \sin(\alpha-\theta) + \{w-(ws-l \sin \theta)/\cos \theta\}\cdot\cos(\alpha-\theta) \quad (4)$$

Figure 11C:
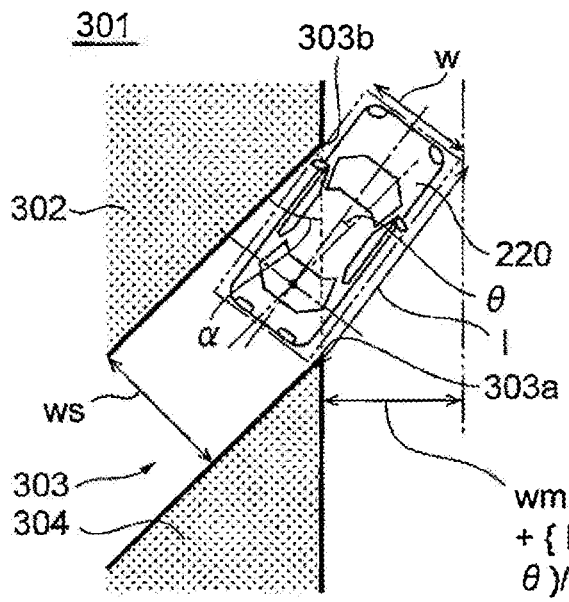

In FIG. 11(c), the corner on the front side in the approach direction of the vehicle 220 is in contact with the internal side on one side of the frame entrance of the parking frame 303, and the side on the inner side (inside during turning) of the vehicle is in contact with the entrance end on the other side of the frame entrance. At this time, a condition where w sin α/sin (α−θ)≤ws<l sin θ+w cos θ is satisfied, and the projection amount wm in this case can be calculated by the following formula (5).

$$wm = w \cos(\alpha-\theta) + \{l-(ws-w \cos \theta)/\sin \theta\}\cdot\sin(\alpha-\theta) \quad (5)$$

When the yaw angle θ of the host vehicle with respect to the parking frame 303 is changed within a range of 0≤θ≤α based on the three patterns in FIGS. 11(a), 11(b), and 11(c), wm is approximately maximum at a boundary point between the case of FIG. 11(a) or 11(b) and the case of FIG. 11(c). At this time, that is, when θ=α−arcsin ((w sin α)/ws), the projection amount wm is represented by formula (1), and can be regarded as the minimum projection amount.

In all the cases, the minimum projection amount represented by formula (1) is not always the maximum value of the projection amount when the vehicle 220 is rotated from the direction of the passage 305 to the direction of the parking frame 303 while keeping the vehicle 220 as close as possible to the parking frame 303. However, the host vehicle reliably projects to the passage 305 up to the minimum projection amount expressed by formula (1), which is a value approximately close to the maximum value of the projection amount. Thus, by using formula (1) instead of the exact maximum value, the unparkable parking frame can be sufficiently detected.

The embodiments of the present invention have been described in detail. However, the present invention is not limited to the above embodiments, and various design changes may be made without departing from the spirit of the present invention described in the claims.

For example, the above embodiments have been described in detail to make the description of the present invention easy to understand, and the present invention is not necessarily limited to including all the above-described configurations. Further, a part of the configuration of one embodiment can be replaced with a configuration of another embodiment, and a configuration of one embodiment can be added to a configuration of another embodiment. Further, it is possible to add, delete, and replace other configurations for a part of the configurations of the respective embodiments.

The parking assistance device of the above embodiments includes the vehicle control unit, controls a driving source such as an engine and a motor by accelerating and decelerating, and performs the steering operation and the shift operation to park the vehicle in the selected parking frame. However, all or some of the functions of the vehicle control unit may be absent. That is, the driver may drive and park in the selected parking frame, viewing the display image. Alternatively, for example, the parking assistance device may perform only the steering operation, and the driver may perform the acceleration and deceleration operation and shift operation to park, viewing the display image.

In the above embodiments, an example has been described in which the vehicle is turned and parked rearward when the vehicle is parked in the parking frame. However, the present invention is not limited thereto, and the vehicle may be moved forward and turned to be parked in the parking frame.

REFERENCE SIGNS LIST

100 Parking assistance device
120 Parking frame detection unit
121 Stationary object detection unit
122 Space map generation unit
123 Parking space extraction unit
124 Travelable area extraction unit
130 Parking frame selection unit
140 Display image generation unit
150 Host vehicle position estimation unit
151 Route generation unit
152 Vehicle control unit
160 Unparkable frame exclusion unit
171 HMI (operation input unit)
172 External environment recognition sensor (external environment recognition device)
173 Input switch
180 Various sensor/actuator ECU
201, 301 Parking lot
202 to 204, 302 to 304 Parking frame
205, 305 Passage (passage space)
220 Vehicle
wr Passage width
wm Minimum projection amount
l Vehicle total length
w Vehicle total width
ws Entrance width of frame entrance of parking frame

The invention claimed is:

1. A parking assistance device that assists a vehicle to park in a parking frame disposed on one side of a passage in a passage width direction from the passage through which vehicles can pass, the parking assistance device comprising:
a parking space information acquisition device that acquires information on an entrance width of a frame entrance of the parking frame and information on a passage width of the passage;
a minimum projection amount calculation device that calculates a minimum projection amount as a minimum passage width required when the vehicle is rotated in a space configured by the parking frame and the passage from a direction of the vehicle at a start of parking to a direction of the vehicle at a completion of parking without considering a turning radius; and a parkability determination device that compares the passage width of the passage with the minimum projection amount, and determines that the vehicle cannot be parked in the parking frame when the passage width of the passage is smaller than the minimum projection amount.

2. The parking assistance device according to claim 1, wherein the minimum projection amount calculation device calculates a projection amount of the vehicle in the passage width direction from the parking frame to the passage when a vehicle corner on a front side of the vehicle in an approach direction to the parking frame and on a first side in a vehicle width direction is located at an entrance end on a first side of the parking frame in the frame width direction, and when the vehicle is virtually disposed at a position where a vehicle side part on a second side of the vehicle in the vehicle width direction is in contact with the entrance end on a second side of the parking frame in the frame width direction is calculated as the minimum projection amount.

3. The parking assistance device according to claim 2, wherein the minimum projection amount calculation device calculates the minimum projection amount based on information on a total length of the vehicle and a total width of the vehicle, information on an intersection angle between a longitudinal direction of the passage and a depth direction of the parking frame, and information on an entrance width of a frame entrance of the parking frame.

4. The parking assistance device according to claim 3, wherein when the intersection angle between the longitudinal direction of the passage and the depth direction of the parking frame is α, the total width of the vehicle is w, the total length of the vehicle is l, the entrance width of the frame entrance of the parking frame is ws, and the minimum projection amount is wm, the minimum projection amount calculation device calculates the minimum projection amount wm by the following formula (1):

$$wm = (w \cdot l \sin \alpha)/ws \qquad (1).$$

5. The parking assistance device according to claim 4, comprising a storage device that calculates in advance and stores the minimum projection amount as a numerical table having the entrance width of the frame entrance of the parking frame and the intersection angle as vertical and horizontal axes.

6. The parking assistance device according to claim 1, wherein the minimum projection amount calculation device sets a total width of the vehicle to the minimum projection amount when the minimum projection amount is smaller than the total width of the vehicle.

7. The parking assistance device according to claim 1, wherein the minimum projection amount calculation device calculates the minimum projection amount by adding a minimum required margin between the vehicle and a stationary three-dimensional object.

8. The parking assistance device according to claim 1, comprising a frame type determination device that determines whether the parking frame is a parallel parking frame, a perpendicular parking frame, or a diagonal parking frame,
wherein the minimum projection amount calculation device calculates the minimum projection amount when the frame type determination device determines that a frame type of the parking frame is the perpendicular parking frame or the diagonal parking frame.

9. The parking assistance device according to claim 1, wherein the minimum projection amount calculation device calculates the minimum projection amount every time the parking frame is detected.

10. The parking assistance device according to claim 1, wherein the minimum projection amount calculation device calculates the minimum projection amount for the parking frame, and then calculates the minimum projection amount for the parking frame again after the host vehicle has traveled a certain distance.

11. The parking assistance device according to claim 1, wherein the minimum projection amount calculation device calculates the minimum projection amount for the parking frame, and then calculates the minimum projection amount for the parking frame again after a certain time has elapsed.

* * * * *